UNITED STATES PATENT OFFICE.

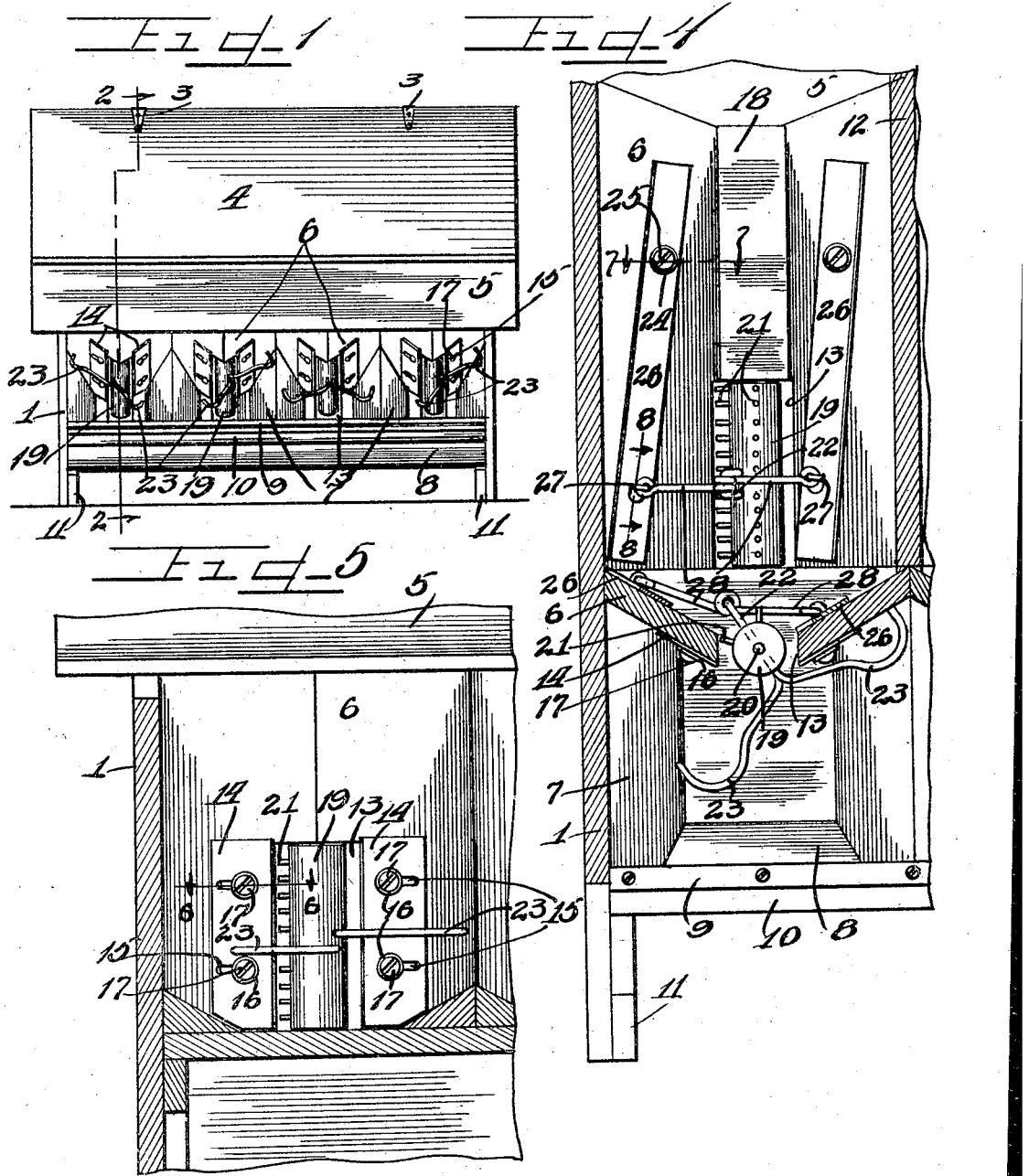

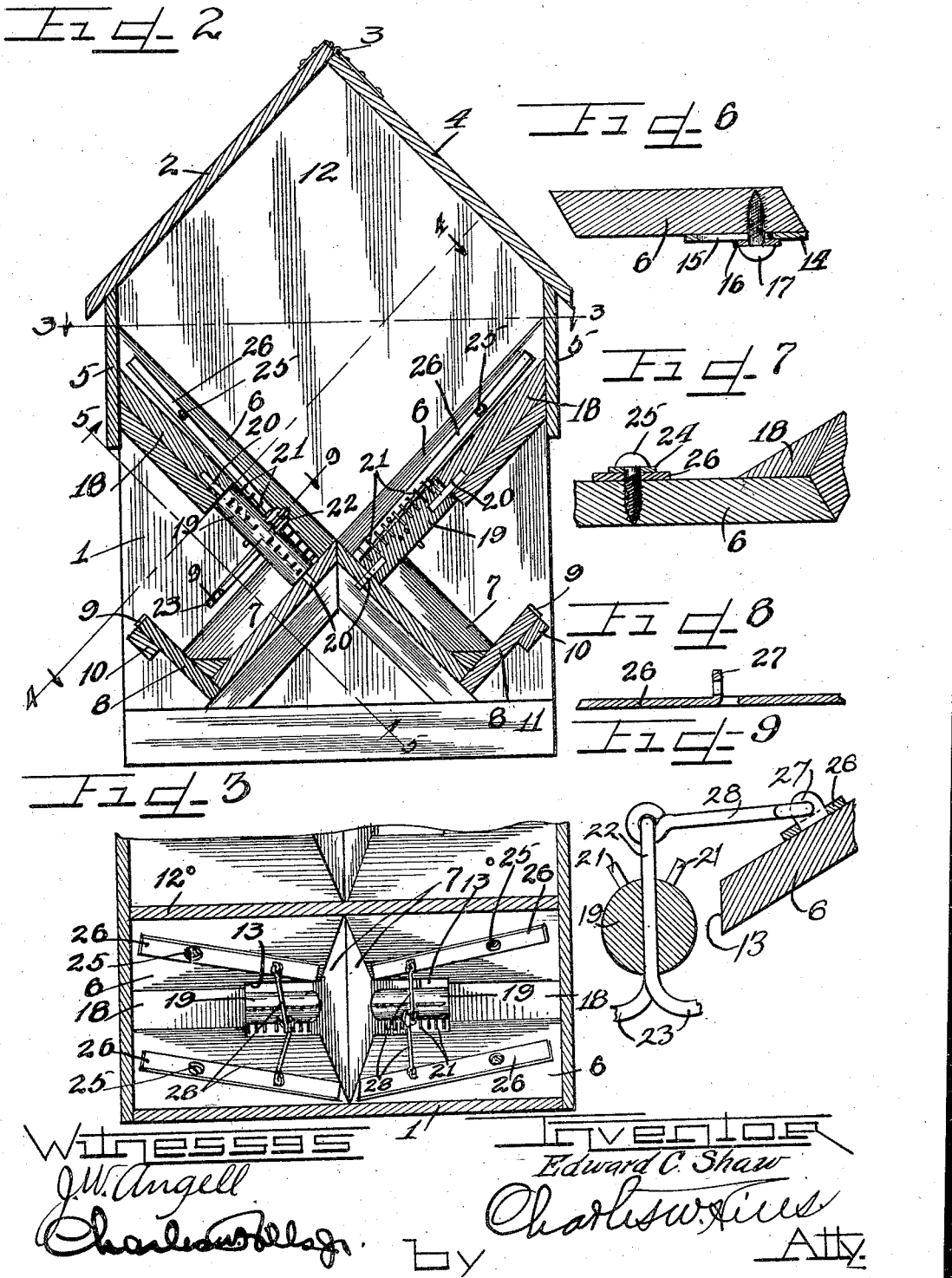

EDWARD C. SHAW, OF GALESBURG, ILLINOIS, ASSIGNOR, BY MESNE ASSIGNMENTS, TO SHAW, WELSH & COMPANY, A CORPORATION OF ILLINOIS.

STOCK FEEDER.

1,419,950.   Specification of Letters Patent.   Patented June 20, 1922.

Application filed July 7, 1919. Serial No. 309,011.

*To all whom it may concern:*

Be it known that I, EDWARD C. SHAW, a citizen of the United States, and a resident of the city of Galesburg, in the county of Knox and State of Illinois, have invented certain new and useful Improvements in a Stock Feeder; and I do hereby declare that the following is a full, clear, and exact description of the same, reference being had to the accompanying drawings and to the numerals of reference marked thereon, which form a part of this specification.

This invention relates more particularly to an improved type of an automatic stock feeder of simple and effective construction adapted to feed only when manipulated by an animal thereby preventing an excess flow of feed from being wasted or exposed by passing into the open feeding trough when not required.

It is an object of this invention to provide a stock feeder wherein feeding rockers are adapted to be operated by the head of an animal feeding to cause feed within a hopper to be discharged through an adjustable discharge opening into a feeding trough.

It is furthermore an object of this invention to construct a stock feeder wherein agitators are provided on a rocker mechanism for the purpose of causing quantities of feed to be discharged through a regulatable hopper discharge opening in which the rocker mechanism is positioned to permit operation of the rocker mechanism by means of rooters attached thereto and adapted to be actuated by an animal desiring feed.

It is an important object of this invention to provide a stock feeder adapted to deliver bran, tankage and other light, soft and most kinds of food equally as well as heavier chopped or crushed grains.

Another object of the invention is the construction of a stock feeder wherein a food discharging mechanism is so positioned in an adjustable hopper discharge opening to permit arms connected with said mechanism to be operated by the head of an animal without interfering with the animal's snout.

Other and further important objects of this invention will be apparent from disclosures in the specification and drawings.

The invention (in a preferred form) is illustrated in the drawings and hereinafter more fully described.

On the drawings:

Figure 1 is a side elevation of a stock feeder embodying the principles of this invention.

Figure 2 is an enlarged section taken on line 2—2 of Figure 1, showing parts in elevation.

Figure 3 is a fragmentary detail section taken on line 3—3, of Figure 2.

Figure 4 is an enlarged fragmentary detail section taken on line 4—4, of Figure 2.

Figure 5 is a sectional view taken on line 5—5, of Figure 2.

Figure 6, is a detail section on line 6—6, of Figure 5.

Figure 7 is a fragmentary detail section taken on line 7—7, of Figure 4.

Figure 8 is a fragmentary detail section of one of the agitators taken on the line 8—8, of Figure 4.

Figure 9 is an enlarged fragmentary detail section taken on line 9—9 of Figure 2, with parts omitted.

As shown on the drawings:

The stock feeder as shown comprises a double sided feeder and embraces a housing or casing constructed of end walls 1, the upper ends of which are tapered and have rigidly secured to one side thereof a stationary roof or cover section 2. Pivotally connected to the upper margin of the stationary roof section 2, by means of hinges 3, is a movable roof section, cover or door 4, adapted for closing the other half of the housing. Rigidly connecting the end walls 1, are side walls 5, the upper edges of which are beveled to permit the roof sections to rest thereon. The side walls 5, close up the upper portion of the housing sides leaving the lower portions open.

Securely mounted within the housing are a plurality of adjacently disposed pairs of oppositely positioned inclined channels or chutes 6, the upper or outer ends of which abut, and are secured to the inner surfaces of the housing sides 5. The lower or inner ends of each pair of chutes 6, seat against the inner surfaces of a pair of inclined oppositely disposed troughs or feed boxes 7. The chutes 6 and the troughs 7, are V-shaped in cross-section, but it will be understood that the shape of said chutes and troughs may be of any desired form, other than that shown. The adjacently disposed inclined troughs 7, on each side of the housing are secured together and have the lower ends thereof closed by means of an inclined feed supporting dash board 8, the ends of which fit against the inner surfaces of the housing end walls 1. A metal strip 9, is secured to the outer upper edge of each of the dash boards 8, to protect the same against wear. A reinforcing bar 10, of wood is also secured along the outer margin of the under surface of each of the dash boards 8.

As clearly shown in Figures 1 and 2, the troughs 7, are disposed to end a short distance from the lower end of the housing, above cross strips 11, secured transversely across the lower portion of the end walls, 1. This construction permits access to be easily had beneath the feeding troughs to permit cleaning.

As shown in Figure 3, the adjacent pairs of chutes 6, may be separated from each other by partitions 12, to divide the upper interior of the housing into a plurality of feed compartments or hoppers, one disposed to feed each pair of the lower compartments or troughs 7, or the hopper may be continuous to feed one or a plurality of troughs, by omitting the partitions. Each hopper chute 6, is provided with a discharge opening 13, in the lower central portion thereof, which is adapted to be controlled by a pair of adjusting plates 14, provided with slots 15, and adjustably secured in position on the bottom surfaces of the respective chute 6, as shown in Figure 5, by washers 16, and locking screws or bolts 17. The screws 17, project through the plate slots 15, and into the boards forming the chutes 6.

A triangularly cross-sectioned filler block 18, is rigidly secured longitudinally within each chute 6, and terminates at the discharge opening 13. Disposed within each discharge opening 13, is a cylindrical drum, feed rocker or roller 19, having secured axially in each end thereof a stub axle or gudgeon pin 20. The stub axles 20, for the rollers are supported in the ends of the filler blocks and in the troughs 7, as shown in Figure 2, to hold the rollers in position in the openings 13. Secured radially in each roller 19, are two longitudinal rows of stirring or feed ejecting pins 21, positioned to project into the respective feed chutes. Projecting diametrically through the middle portion of each roller 19, is the looped middle portion or bight 22, of a rooter or operating mechanism made of heavy wire or other suitable material and having the ends curved and bent outwardly in opposite directions to form arms 23, as shown in Figure 4. The arms 23, controlling the operation of the rollers 19, are positioned within the feed troughs 7, in a convenient position to be engaged and operated by the head of an animal.

Pivotally mounted on the inner surface of each of the inclined walls of each chute 6, by means of a washer 24, and a screw 25, is one end of a shaker bar or agitator 26, the other or lower end of which has an apertured lug or tongue 27, struck therefrom. A link 28, is provided for each shaker bar to connect the apertured lug 27, thereof with the bight 22, of the respective rooter mechanisms.

The operation is as follows:

Both sides of the device may be used at the same time for feeding stock, and if desired the feeder may be placed in position in a fence dividing two fields or pens to permit two sets of stock to use the same feeder. The hoppers formed in the upper interior portion of the housing are adapted to be filled by lifting the hinged cover 4. Bran, tankage, grain or any other kind of feed placed within the hoppers falls by gravity to the bottom of the hoppers into position to be discharged through the openings 13, passing around the rollers 19, when the device is operated. The size of the discharge openings 13, may be varied by loosening the screws 17, and sliding the adjustable plates 14, toward or away from one another. The plates 14, are locked in their adjusted positions by means of the screws 17.

The rooter arms 23, are formed to provide a yoke, as shown in Figure 4, to permit the head of an animal, particularly a pig, to be easily engaged therebeneath, with the curved or hooked ends of said arms positioned on opposite sides of the animal's snout. Movement of a rooter to one side or the other by the swinging of an animal's head while feeding causes rotation of the rollers 19, whereby the pivoted bight 22, of the rooter serves to actuate the links 28, and thereby swing the agitators 26, about their pivots and thus loosen up the feed in the hopper. With the rotation of a roller the pins 21, thereof are moved to engage and force a quantity of the feed through the discharge opening 13, into the feeding trough 7, therebelow, where the feed is easily accessible to an animal, whose head is engaged through the open side of the housing.

It will be noted that the rooters are adapted to be swung to either side, and that feed is dispensed from the hoppers into the feeding troughs only when the rollers are actually being rotated by the heads of animals feeding. This arrangement permits only sufficient feed to enter the troughs for immediate consumption, and the amount deposited with each operation of a rooter is, as already described, regulated by means of the slidable plates 14. Food waste is thus reduced to a minimum and the stock feeder is kept in a sanitary condition. The feeding troughs are elevated to permit access therebelow for the purpose of cleaning, and ventilation.

I am aware that numerous details of construction may be varied through a wide range without departing from the principles of my invention and I therefore do not purpose limiting the patent granted otherwise than necessitated by the prior art.

I claim as my invention:

1. A stock feeder embracing a hopper having a discharge opening therein, a trough therebelow, a rocker in said opening, means in said trough projecting through the rocker to permit operating of the rocker, links in said hopper connected with said means, and agitators pivotally mounted in said hopper and connected with said links to be actuated thereby when said rocker is operated by said means.

2. A stock feeder comprising a feed compartment having an outlet opening therein, a feeding trough therebelow, a roller arranged in said opening, a rooter in said trough projecting diametrically through said roller into said feed compartment, ejecting pins on said roller, and feed agitators in said feed compartment connected with the rooter to be actuated thereby when said rooter is moved to operate said roller to cause the pins thereon to eject feed from said feed compartment into said trough.

3. A stock feeder comprising a housing, a feed hopper therein provided with an opening, a feeding trough therebelow, a drum rotatably mounted in said opening, pins radially projecting therefrom, a rooter mechanism in said trough projecting through said drum into said hopper, feed agitators pivotally mounted in said hopper, and links pivotally connected with said agitators and with said rooter, said rooter adapted to be swung from side to side by the head of an animal feeding to cause feed loosened up by said agitators to be ejected through said opening by said drum pins.

4. The combination with a feed hopper having an outlet opening therein, of means obstructing said opening, and a rooter projecting diametrically therethrough having integral arms bent in opposite directions and curved to form a yoke to permit the rooter to be engaged and actuated by the swinging motion of a pig's head when feeding to cause said means to eject feed through said outlet opening.

5. The combination with a feed hopper provided with an opening, agitating means and discharge means supported by said hopper, and a mechanism projecting diametrically through the discharge means into the hopper and adjustably connected with said agitating means, said mechanism adapted to be operated by the head of an animal feeding to cause simultaneous operation of both of said means whereby feed is dispensed through said opening.

6. A stock feeder comprising a feed hopper provided with an opening, a feed ejector mounted in said opening, a rooter mechanism embracing a looped member having the bight thereof projecting through said ejector and the free ends thereof bent in opposite directions and curved to form a yoke member and agitators in said hopper connected with said bight, said yoke member adapted to be engaged by the head of an animal and swung from side to side to cause simultaneous operation of said agitators and said ejector to cause feed to be dispensed through said opening only when the rooter is actuated.

7. A stock feeder embracing a feed container provided with an opening, agitators pivotally mounted therein on opposite sides of said opening, rotatable means in said opening, adjustable members on said container for controlling the size of said opening, a feeding trough below said opening, and a rooter in said trough projecting through said rotatable means and connected with said agitators for simultaneously operating the same to cause feed from the container to be ejected in said trough.

In testimony whereof I have hereunto subscribed my name in the presence of two subscribing witnesses.

EDWARD C. SHAW.

Witnesses.
EARL M. HARDINE,
CHARLES W. HILLS, JR.